US006740156B2

(12) United States Patent
Kehrmann

(10) Patent No.: US 6,740,156 B2
(45) Date of Patent: May 25, 2004

(54) CARRIER SUBSTANCE FOR A HYDRAULIC BINDER

(75) Inventor: Alexander Kehrmann, Duisburg (DE)

(73) Assignee: Ferro-Duo GmbH, Duisburg (DE)

( * ) Notice: Subject to any disclaimer, the term of this patent is extended or adjusted under 35 U.S.C. 154(b) by 0 days.

(21) Appl. No.: 10/361,467

(22) Filed: Feb. 10, 2003

(65) Prior Publication Data

US 2004/0025751 A1 Feb. 12, 2004

(30) Foreign Application Priority Data

Aug. 9, 2002 (EP) .............................. 02017886

(51) Int. Cl.$^7$ ................................. C04B 7/00
(52) U.S. Cl. ....................... 106/733; 106/736; 106/737; 106/815
(58) Field of Search ................. 106/733, 736, 106/737, 815

(56) References Cited

U.S. PATENT DOCUMENTS 3,663,286 A * 5/1972 De Barrau ................. 106/819
6,277,190 B1 * 8/2001 Schulte et al. ............. 106/802

FOREIGN PATENT DOCUMENTS

| DE | 197 44 035 | 4/1999 |
| DE | 100 14 468 | 7/2001 |

OTHER PUBLICATIONS

Wilhelm Manns et al.: "Eisen(II)sulfat als Zusatz zur Chromatreduzierung", in: Betontechnologie, Feb. 1999.

* cited by examiner

*Primary Examiner*—Elizabeth D. Wood
(74) *Attorney, Agent, or Firm*—Henry M. Feiereisen

(57) ABSTRACT

A hydraulic binder, includes cement, and a mixture added to the cement and made of moist green vitriol and an inert carrier substance in the form of silica gel or alumina.

18 Claims, No Drawings

CARRIER SUBSTANCE FOR A HYDRAULIC BINDER

CROSS-REFERENCES TO RELATED APPLICATIONS

This application claims the priority of European Patent Application, Ser. No. 02 017 886.9, filed Aug. 9, 2002, pursuant to 35 U.S.C. 119(a)-(d), the disclosure of which is incorporated herein by reference.

BACKGROUND OF THE INVENTION

The present invention relates, in general, to a hydraulic binder, and more particularly to a carrier substance for use in a hydraulic carrier.

Cement is typically used in the construction industry as finely ground hydraulic binder for making concrete mortar, concrete stones and finished parts. Oftentimes, cement is manually processed. This is disadvantageous because typical cement contains chromate which can trigger allergic reactions such as skin eczema, so-called cement dermatitis or bricklayer scabies.

Chromate-containing cement includes up to 100 pp, chromium(VI) compounds (chromates) of which about 20% are soluble. Soluble chromate is the cause of the allergic cement eczemas. By utilizing cement which is almost free of chromate and cement-containing preparations that are low in chromate, for example, tile adhesive or dry mortar, diseases of this type can be effectively eliminated. For that reason, cement-containing materials which are handled manually are produced exclusively with low content of chromate. Chromate-containing cement means a cement which contains less than 2 ppm water-soluble chromium(VI) relative to the dry mass.

It is known, to decrease the chromate content in cement through addition of a reducing agent, e.g. iron(II) sulfate. German patent publication no. DE 197 44 035 A1 describes the addition of dry iron(II) sulfate particles to cement at an amount of 0.01 to 1 wt. %, when the cement is withdrawn from a large silo. During preparation of the mortar or concrete mixture, the granular iron(II) sulfate dissolves in the mixing water and contacts the chromate(VI) during mixture to thereby chemically reduce it.

Also Manns, W.; Laskowski, Ch. describe in an article, entitled Eisen(II)sulfat als Zusatz zur Chromatreduzierung [Iron(II) sulfate for chromate reduction] in BE-Z: Beton [Concrete], journal 2/1999, pages 78–85, the use of dry pulverulent iron(II) sulfate for chromate reduction.

Dry iron(II) sulfate looses, however, effectiveness as a result of oxidation with atmospheric oxygen. Therefore, iron(II) sulfate has been added to cement only at a time when the cement is withdrawn from the large silo to thereby decrease the risk of undesired reaction as the granular iron(II) sulfate is added to the cement.

German patent publication no. DE 100 14 468 A1 describes the production of a building material made from a mixture of cement, water and additives and the addition of moist iron(II) sulfate, so-called green (iron) vitriol, to the mixture. Moist green vitriol has the same reduction qualities with respect to chromium(VI) compounds as dry iron(II) sulfate particles, but is significantly more cost-efficient and is in full compliance with all regulations.

To improve handling of moist green vitriol, an inert carrier material is added. Commonly assigned utility model DE 201 19 021, issued on Jan. 31, 2002, by the same inventive entity, and entitled "Hydraulisches Bindemittel" [Hydraulic Binder], describes the use of ground limestone as carrier substance. Practice has shown, however, that the addition of green vitriol causes problems during metering and the inert carrier substance adversely affects the processing of the finished building material as a result of its grain size.

It would therefore be desirable and advantageous to provide an improved hydraulic binder which obviates prior art shortcomings and which is easy to make and to use while still being almost free of chromate.

SUMMARY OF THE INVENTION

According to one aspect of the present invention, a hydraulic binder includes cement, and a mixture added to the cement and made of moist green vitriol and an inert carrier substance in the form of silica gel or alumina.

The use of inert carrier substance within the mixture assumes the function of a drying agent and a moisture buffer. Mixture of the moist green vitriol with the carrier substance in the form of silica gel or alumina provides this mixture with the required properties for use in cement. The drying and buffer action of the carrier substance ensures an optimal setting of the green vitriol. Oxidation with atmospheric oxygen as well as lumping is avoided. The mixture can be added to cement and mixed therewith, without encountering lumping. Iron(II) sulfate is dissolved in the mixing water only during preparation of a mortar mixture or concrete mixture and then contacts chromate(VI) to reduce it chemically.

Screening of the mixture to the desired grain size or fineness is realized in suitable processing devices, such as mills, e.g., ball mils. Material can then be prepared in a fairly simple manner and added to cement without any problems.

According to another feature of the present invention, the mixture may have a graining with a residue of maximal 30%, preferably maximal 20%, on a sieve of 0.2 mm mesh. A fine-grained mixture is easier to meter and better to process.

The inert carrier substance according to the present invention is fine-grained or powdery and may be made of silica gel or alumina. Silica gel involves a solid amorphous silicic acid which is known for use as adsorption agent for gas, vapor and liquids and can be made with pores of different diameter. Silica gels exhibit a large inner surface, which may range up to 800 m$^2$/g, to absorb liquid.

Silica gel can be manufactured synthetically as condensation product from silicon dioxide. Hereby, sodium silicate may be mixed with a mineral acid, e.g. sulfuric acid. A sol ($SiO_2$, $Na_2SO_4$, $H_2O$) is produced from these materials and allowed to solidify to form jelly. Sodium sulfate, obtained from comminuted jelly pieces, is then washed out. Different properties, such as pore volume, pore diameter and inner surface may be implemented through suitable control of the washing process with different pH values, temperatures and other parameters. The washed product is called hydrogel and is transformed after drying to silica gel as uneven granulate.

The use of silica gel for use as carrier substance is currently a preferred embodiment for mixture with green vitriol.

Silica gel contains as main ingredient silicate ($SiO_2$) and further includes aluminum ($Al_2O_3$), sodium ($Na_2O$), sulfate ($SO_4$) as well as iron ($Fe_2O_3$), potassium ($K_2O$), lanthanum ($La_2O_3$), ammonium ($NH_4^+$), chloride ($Cl^-$) and cerium ($Ce_2O_3$). Also calcium (Ca) and magnesium (Mg) may be contained.

The inert carrier substance may also be made of alumina, in particular activated alumina. Activated alumina is activated aluminum oxide ($Al_2O_3$). Involved here is a natural clay mineral (bentonite) in crumbly form with similar adsorption capability for moisture as silica gel.

According to another feature of the present invention, the mixture of green vitriol and a carrier substance in the form of silica gel or alumina may further include at least one additive selected from the group consisting of zinc, aluminum, phosphorus, and titanium oxide. In this way, the mechanical properties, e.g. toughness or flow behavior, of the building material produced with the assistance of the hydraulic binder according to the present invention can be adjusted. Zinc, for example, promotes strength and is added at an amount of less than 10 wt. %. Phosphorus may be used to delay the solidification time of the cement, and may also be added at an amount of less than 10 wt. %.

According to another feature of the present invention, the mixture of green vitriol and a carrier substance in the form of silica gel or alumina may be added to the cement at an amount between 0.01 wt. % to 5 wt. % in relation to the amount of cement. In this way, the chromate content is effectively reduced to below the level that poses a health hazard.

According to another feature of the present invention, the carrier substance is contained in the mixture at an amount between 5 wt. % to 15 wt. % in relation to the amount of green vitriol.

BRIEF DESCRIPTION OF THE DRAWING (None)

DETAILED DESCRIPTION OF PREFERRED EMBODIMENTS (None)

While the invention has been described in connection with currently preferred embodiments shown and described in detail, it is not intended to be limited to the details shown since various modifications may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A hydraulic binder, comprising:
   cement; and
   a mixture added to the cement and made of moist green vitriol and an inert carrier substance in the form of silica gel.

2. The hydraulic binder of claim 1, wherein the silica gel contains silicate ($SiO_2$) as main ingredient and further includes aluminum ($Al_2O_3$), sodium ($Na_2O$), sulfate ($SO_4$) as well as iron ($Fe_2O_3$), potassium ($K_2O$), lanthanum ($La_2O_3$), ammonium ($NH_4^+$), chloride ($Cl^-$) and cerium ($Ce_2O_3$).

3. The hydraulic binder of claim 2, wherein the silica gel contains calcium (Ca) and magnesium (Mg).

4. The hydraulic binder of claim 1, wherein the mixture has a graining with a residue of maximal 30% on a sieve of 0.2 mm mesh.

5. The hydraulic binder of claim 4, wherein the residue is maximal 20%.

6. The hydraulic binder of claim 1, wherein the mixture further includes at least one additive selected from the group consisting of zinc, aluminum, phosphorus, and titanium oxide.

7. The hydraulic binder of claim 1, wherein zinc and phosphorus are added at an amount of less than 10 wt. %.

8. The hydraulic binder of claim 1, wherein the mixture is added to the cement at an amount between 0.01 wt. % to 5 wt. % in relation to the amount of cement.

9. The hydraulic binder of claim 1, wherein the carrier substance is contained in the mixture at an amount between 5 wt. % to 15 wt. % in relation to the amount of green vitriol.

10. A hydraulic binder, comprising:
    cement; and
    a mixture added to the cement and made of moist green vitriol and an inert carrier substance in the form of alumina.

11. The hydraulic binder of claim 10, wherein the carrier substance is activated alumina.

12. The hydraulic binder of claim 11, wherein the activated alumina is activated aluminum oxide ($Al_2O_3$).

13. The hydraulic binder of claim 10, wherein the mixture has a graining with a residue of maximal 30% on a sieve of 0.2 mm mesh.

14. The hydraulic binder of claim 13, wherein the residue is maximal 20%.

15. The hydraulic binder of claim 10, wherein the mixture further includes at least one additive selected from the group consisting of zinc, aluminum, phosphorus, and titanium oxide.

16. The hydraulic binder of claim 10, wherein zinc and phosphorus are added at an amount of less than 10 wt. %.

17. The hydraulic binder of claim 10, wherein the mixture is added to the cement at an amount between 0.01 wt. % to 5 wt. % in relation to the amount of cement.

18. The hydraulic binder of claim 10, wherein the carrier substance is contained in the mixture at an amount between 5 wt. % to 15 wt. % in relation to the amount of green vitriol.

* * * * *